United States Patent [19]
Gridnev et al.

[11] Patent Number: 5,847,060
[45] Date of Patent: *Dec. 8, 1998

[54] FUNCTIONALIZED DIENE OLIGOMERS

[75] Inventors: Alexei Alexeyevich Gridnev; Steven Dale Ittel, both of Wilmington, Del.

[73] Assignee: E. I. du Pont de Nemours and Company, Wilmington, Del.

[ * ] Notice: The term of this patent shall not extend beyond the expiration date of Pat. No. 5,587,431.

[21] Appl. No.: 912,593

[22] Filed: Aug. 18, 1997

[51] Int. Cl.$^6$ .............................. C08F 4/06; C08F 14/14; C08F 36/04; C08F 36/06
[52] U.S. Cl. .......................... 526/172; 526/335; 526/291
[58] Field of Search .................................. 526/172, 291, 526/335

[56] References Cited

U.S. PATENT DOCUMENTS

| | | | |
|---|---|---|---|
| 3,775,390 | 11/1973 | Khan | 260/92.3 |
| 4,694,054 | 9/1987 | Janowicz | 526/93 |
| 4,742,137 | 5/1988 | Ono et al. | 526/92 |
| 5,231,131 | 7/1993 | Chu et al. | 524/504 |
| 5,357,010 | 10/1994 | Sauterey et al. | 526/220 |
| 5,362,826 | 11/1994 | Berge et al. | 526/194 |
| 5,587,431 | 12/1996 | Gridnev et al. | 525/269 |

OTHER PUBLICATIONS

Tetrahedron Letters, 28(15), pp. 1649–1650, 1987.
Prog. Polym. Sci., 21, 1996, pp. 439–503.
Polym. Preprints, 38(1), 1997, pp. 663–664 and 746–747.
J. Polym. Sci., Part A: Polym. Chem 33(16), 1995, 2773–2786.

*Primary Examiner*—Jeffrey T. Smith
*Assistant Examiner*—Wu C. Cheng

[57] ABSTRACT

This invention relates to the controlled molecular weight production of macromonomers and polymers with terminal conjugated double bonds from starting monomers including, but not limited to substituted butadienes. The terminal diene end thus produced is also a potential reaction site for further polymerization or functionalization. The molecular weight is controlled by use of Co chain transfer catalysts and appropriate process conditions.

13 Claims, No Drawings

FUNCTIONALIZED DIENE OLIGOMERS

FIELD OF THE INVENTION

This invention relates to the controlled molecular weight production of macromonomers and polymers with terminal conjugated double bonds from starting monomers including, but not limited to substituted butadienes. The terminal diene end thus produced is also a potential reaction site for further polymerization or functionalization.

TECHNICAL BACKGROUND

The production of chloroprene and poly(chloroprene) is well known to those skilled in the art. U.S. Pat. No. 5,357,010 discloses a process for producing poly (chloroprene) with a plurality of monomer units terminated by ~S-alkylxanthogen and/or ~S-acylaminophenyl groups. All chain transfer agents used therein contain sulfur.

U.S. Pat. No. 3,775,390 discloses the polymerization of chloroprene in an alkaline aqueous emulsion in the presence of both an organic sulfur-containing chain transfer agent and a benzothiozolesulfenamide.

U.S. Pat. No. 4,742,137 discloses a process for producing an aqueous dispersion of polymer particles comprised of a conjugated diene and crystalline polymer. Two catalysts are used, but neither are the Co complexes used in the present invention.

U.S. Pat. No. 4,694,054 discloses the use of cobalt chain transfer catalysts for molecular weight control and production of macromonomers.

U.S. Pat. Nos. 5,231,131 and 5,362,826 disclose the incorporation of methacrylate oligomers obtained by the cobalt-catalyzed chain transfer reaction into polymer backbone by co-polymerization with other or the same monomers to form co-polymers of different architecture(graft, block-co-polymers, branched, etc.).

U.S. Pat. No. 5,587,431 describes a method of preparing compositions of terminally unsaturated polymers by re-initiating the terminated ends of a terminally unsaturated oligomer with additional chain transfer catalyst (CTC) for further oligomerization. PCT/US 97/02912 filed on Feb. 18, 1997, describes the molecular weight control of acrylates and styrenics using cobalt chain transfer catalysts.

A palladium-catalyzed reaction of 1,1-dichloroethylene with acetylenes and vinylalanes to yield chlorinated products having conjugated double bonds has been reported. (See Tetrahedron Letters, 28(15), pp. 1649–1650, 1987.) However, the products are not polymeric in nature.

Polymers with pentadiene functionality on the chain end can be produced using addition-fragmentation chain transfer agents which are derived from conjugated dienes. These chain transfer agents generally include sulfur compounds. See generally Prog. Polym. Sci., 21, 1996, pp. 439–503, Polym. Preprints, 38(1), 1997, pp. 663–664 and 746–747, and J. Polym. Sci., Part A: Polym. Chem. 33(16), 1995, 2773–86. The resulting polymers have structures differentiable from those claimed herein.

SUMMARY OF THE INVENTION

The present invention relates to a process for polymerizing substituted butadienes to substituted polybutadienes having controlled molecular weight and end-group functionality, said process employing a cobalt chain transfer catalyst in the presence of a free-radical initiator.

Disclosed is a process for polymerizing substituted butadienes to substituted polybutadienes having controlled molecular weight and end-group functionality; wherein the process consists of contacting a substituted butadiene, in the optional presence of a comonomer, with a cobalt chain transfer catalyst and a free radical initiator, said substituted butadienes having a structure $$CHR^1{=}CX{-}CY{=}CR^2R^3$$

where X and Y are each independently selected from the group consisting of H, alkyl, substituted alkyl, COO(Metal), COOR, CN, OR, —COR, —CONR$_2$, —OCOR, halogen, aryl, and substituted aryl;

where R is selected from the group consisting of alkyl, substituted alkyl, aryl, substituted aryl, and hydrogen;

said alkyl and substituted alkyl groups having one or more carbon atoms;

said aryl groups having six or more carbon atoms; and provided that both X and Y cannot both be H;

wherein the metal is selected from the group consisting of lithium, sodium, potassium, magnesium, cadmium and zinc;

wherein $R^1$, $R^2$ and $R^3$ are each selected from the group consisting of alkyl, substituted alkyl, aryl, substituted aryl, halide, nitrile, ester, ether, CN and hydrogen;

said alkyl and substituted alkyl groups having one or more carbon atoms;

said aryl groups having six or more carbon atoms; and wherein any two of $R^1$, $R^2$ and $R^3$ are optionally arranged in a cyclic structure;

said reaction carried out at a temperature from about room temperature to about 240° C., in the optional presence of a solvent.

This invention also relates to the resulting terminally-functionalized polymer or oligomers of the structure:

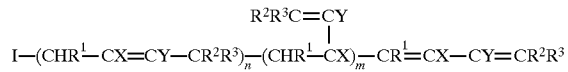

wherein

I is an initiating group derived from an initiator for said polymerization process, or a hydrogen atom derived from said cobalt chain transfer catalyst;

n is greater than 2;

m is zero or greater; and wherein $R^1$, $R^2$, and $R^3$ are selected from the group consisting of alkyl, substituted alkyl, aryl, substituted aryl, halide, nitrile, ester, ether, CN and hydrogen;

said alkyl and substituted alkyl groups having one or more carbon atoms;

said aryl groups having six or more carbon atoms.

DETAILS OF THE INVENTION

The polymerization of substituted butadienes involves the use of a cobalt chain transfer catalyst in the presence of an initiator, and can be run in any generally-used polymerization mode, including batch and continuous (CSTR). The methods employed in this invention are described below.

By "controlled molecular weight" is meant a molecular weight substantially lower than that which would be obtained in the absence of the chain transfer catalyst. Typically, the molecular weights would be less than half that obtained without the chain transfer catalyst and preferably, less than 25% that obtained without the chain transfer catalyst.

Preferred substituted dienes include chloroprene, isoprene, 2-phenyl-1,3-butadiene, cyanoprene, 2-carbomethoxy-1,3-butadiene, and 2,3-dichloro-1,3-butadiene. Most preferred substituted dienes are chloroprene and 2,3-dichloro-1,3-butadiene.

Preferred metallic chain transfer catalysts for use in making the present materials are cobalt (II) and (III) chelates. Examples of such cobalt compounds are disclosed in U.S. Pat. No. 4,680,352, U.S. Pat. No. 4,694,054, U.S. Pat. No. 5,324,879, WO 87/03605 published Jun. 18, 1987, U.S. Pat. No. 5,362,826, and U.S. Pat. No. 5,264,530. Other useful cobalt compounds (cobalt complexes of porphyrins, phthalocyanines, tetraazoporphyrins, and cobaloximes) are respectively disclosed in Enikolopov, N. S., et al., USSR Pat. 664,434 (1978); Golikov, I., et al., USSR Pat. 856,096 (1979); Belgovskii, I. M., USSR Pat. 871,378 (1979); and Belgovskii, I. M., et al., USSR Pat. 1,306,085 (1986). These catalysts operate at close to diffusion-controlled rates and are effective at part-per-million concentrations. Examples of these cobalt (II) and cobalt (III) chain transfer catalysts include, but are not limited to, those represented by the following structures:

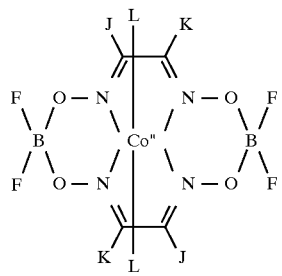

Co(II)(DPG—BF$_2$)$_2$   J = K = Ph, L = ligand
Co(II)(DMG—BF$_2$)$_2$   J = K = Me, L = ligand
Co(II)(EMG—BF$_2$)$_2$   J = Me, K = Et, L = ligand
Co(II)(DEG—BF$_2$)$_2$   J = K = Et, L = ligand
Co(II)(CHG—BF$_2$)$_2$   J = K = —(CH$_2$)$_4$—, L = ligand

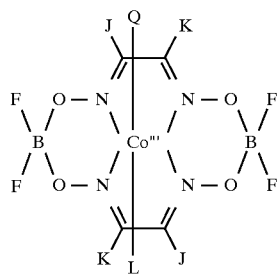

QCo(III)(DPG—BF$_2$)$_2$   J = K = Ph, R = alkyl, L = ligand
QCo(III)(DMG—BF$_2$)$_2$   J = K = Me, R = alkyl, L = ligand
QCo(III)(EMG—BF$_2$)$_2$   J = Me, K = Et, R = alkyl, L = ligand
QCo(III)(DEG—BF$_2$)$_2$   J = K = Et, R = alkyl, L = ligand
QCo(III)(CHG—BF$_2$)$_2$   J = K = —(CH$_2$)$_4$—, R = alkyl, L = ligand
QCo(III)(DMG—BF$_2$)$_2$   J = K = Me, R = halogen, L = ligand L can be a variety of additional neutral ligands commonly known in coordination chemistry. Examples include water, amines, ammonia and phosphines. The catalysts can also include cobalt complexes of a variety of porphyrin molecules such as tetraphenylporphyrin, tetraanisylporphyrin, tetramesitylporphyrin and other substituted species. Q is an organic radical (e.g., alkyl or substituted alkyl); preferred Q groups are isopropyl, 1-cyanoethyl, and 1-carbomethoxyethyl. The catalyst used in the examples below is commonly known as COBF, which represents the chemical name (Bis-[(1,2-dimethyl-ethanedioximato)(2-)O:O'-tetrafluorodiborato(2-)-N'N''N'''N''''](2-propyl)cobalt (III)). It is one of the most active catalysts.

Chloroprene prefers to self-polymerize (see generally Kirk-Othmer Encyclopedia of Chemical Technology, Vol 8, pp. 515–534, John Wiley & Sons, 979). However, the presence of the terminal conjugated double bonds, as found with the present invention, enables the copolymerization of chloroprene at an improved rate. Chloroprene, isoprene, 2-phenyl-1,3-butadiene and other related diene monomers can copolymerize with one or more acrylates, methacrylates, styrenes, acrylonitrile, methacrylonitrile, or related vinyl compounds capable of undergoing free radical copolymerization with chloroprene.

Preferred comonomers are: acrylonitrile, methacrylonitrile, vinyl methyl ketone, 4-chlorostyrene, 4-chloromethylstyrene, 2,3-dimethylstyrene, 3,4-dichlorostyrene, 4-bromostyrene, 4-hydroxystyrene, 4-methoxystyrene, 4-oxymethylstyrene, 4-bromomethylstyrene, 4-styrenesulfonic acid, sodium salt of 4-styrenesulfonic acid, 4-styrenesulfonyl chloride, methyl acrylate, ethyl acrylate, propyl acrylate, 2-hydroxyethyl acrylate, 3-hydroxypropyl acrylate, 2-hydroxypropyl acrylate, butyl acrylate, amyl acrylate, hexyl acrylate, 2-ethylhexyl acrylate, nonyl acrylate, dodecyl acrylate, glycidyl acrylate, acrylamide, N,N'-dimethylacrylamide, bisacrylamide, 2-acrylamido-2-methyl-1-propanesulfonic acid, acrylic acid, sodium salt of acrylic acid, zinc salt of acrylic acid, acryloyl chloride, [2-(acryloyloxy)ethyl] trimethyl ammonium chloride, 2-ethyloxyethyl acrylate, 2-(N,N'-dimethylamino)-ethyl acrylate, methacryloyl chloride, methacrylic anhydride, acrylic anhydride, [2-(methacryloyloxy)ethyl]trimethyl ammonium chloride, 2-(methacryloyloxy)ethyl methacrylate, 2-(methacryloyloxy)ethylacetoacetate, [2-(methacryloyloxy)propyl]-trimethyl ammonium chloride, vinylchloride, 4-vinylbenzoic acid, vinyl acrylate, vinyl methacrylate, vinyl chloroformate, vinyl pyridine, benzyl acrylate, methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha methyl styrene, trimethoxysilylpropyl methacrylate, triethoxysilylpropyl methacrylate, tributoxysilyipropyl methacrylate, dimethoxymethylsilylpropyl methacrylate, diethoxymethyl-silylpropylmethacrylate, dibutoxymethylsilylpropyl methacrylate, diisopropoxymethylsilylpropyl methacrylate, dimethoxysilylpropyl methacrylate, diethoxysilyipropyl methacrylate, dibutoxysilylpropyl methacrylate, diisopropoxysilylpropyl methacrylate, isopropenyl butyrate, isopropenyl acetate, isopropenyl benzoate, isopropenyl chloride, isopropenyl fluoride, isopropenyl bromide, itaconic acid, itaconic anhydride, dimethyl itaconate, methyl itaconate, N-tert-butyl methacrylamide, N-n-butyl methacrylamide, N-methyl-ol methacrylamide, N-ethyl-ol methacrylamide, isopropenylbenzoic acid (all isomers), diethylamino alpha-methylstyrene (all isomers), para-methyl-alpha-methylstyrene (all isomers), diisopropenylbenzene (all isomers), isopropenylbenzene sulfonic acid (all isomers), methyl 2-hydroxymethylacrylate, ethyl 2-hydroxymethylacrylate, propyl 2-hydroxymethylacrylate (all isomers), butyl 2-hydroxymethylacrylate (all isomers), 2-ethylhexyl 2-hydroxymethylacrylate, isobornyl 2-hydroxymethylacrylate, methyl 2-chloromethylacrylate, ethyl 2-chloromethylacrylate, propyl 2-chloromethylacrylate (all isomers), butyl 2-chloromethylacrylate (all isomers), 2-ethylhexyl 2-chloromethylacrylate, isobornyl 2-chloromethylacrylate, and vinylpyrrolidone.

An initiator which produces carbon-centered radicals, sufficiently mild not to destroy the metal chelate chain transfer catalyst, is also typically employed in preparing the polymers. Suitable initiators are azo compounds having the requisite solubility and appropriate half life, including azocumene; 2,2'-azobis(2-methyl)-butanenitrile; 2,2'-azobis (isobutyronitrile)(AIBN); 4,4'-azobis(4-cyanovaleric acid); and 2-(t-butylazo)-2-cyanopropane.

The polymerization process, employing the above described metallic chain transfer catalysts, is suitably carried out at a temperature ranging from about room temperature to about 240° C. or higher, preferably about 50° C. to 150° C.

The polymers made by the inventive process are typically prepared in a polymerization reaction by standard solution polymerization techniques, but may also be prepared by emulsion, suspension or bulk polymerization processes. The polymerization process can be carried out as either a batch, semi-batch, or continuous (CSTR) process. When carried out in the batch mode, the reactor is typically charged with metal chain transfer catalyst, and the selected monomer(s), optionally with a solvent. To the mixture is then added the desired amount of initiator, typically such that the monomer-to-initiator ratio is 5 to 1000. The mixture is then heated for the requisite time, usually about 30 minutes to about 12 hours. In a batch process, the reaction may be run under pressure to avoid monomer reflux.

The polymerization can be carried out in the abence of a solvent or in the presence of any medium or solvent suitable for free-radical polymerization, including, but not limited to, ketones such as acetone, butanone, pentanone and hexanone, alcohols such as isopropanol, amides such as dimethyl formamide, aromatic hydrocarbons such as toluene and xylene, ethers such as tetrahydrofuran, diethyl ether and ethylene glycol, dialkyl ethers such as Cellosolves® solvent, alkyl esters or mixed ester ethers such as monoalkyl ether-monoalkanoates, and mixtures of two or more solvents.

The freeze-pump-thaw cycle, as used in the examples below, is described in D. F. Shriver, et al., "The Manipulation of Air Sensitive Compounds", 2nd ed., Wiley Interscience, 1986.

A key advantage to the present invention is the avoidance of sulfurcontaining catalysts. These sulfur compounds have objectionable odors, and produce waste by-products which must then be disposed of, thereby impacting the environment. This invention produces relatively clear products needing little further purification, and therefore can reduce the cost of the final products. The relatively clear materials can be used for "O"-rings, adhesives, in coatings and paints, as well as any other products in which poly(chloroprene) is commonly used.

Oligomers, macromonomers and polymers made by the present process are useful in a wide variety of coating and molding resins. Other potential uses can include cast, blown, spun or sprayed applications in fiber, film, sheet, composite materials, multilayer coatings, photopolymerizable materials, photoresists, surface active agents, dispersants, adhesives, adhesion promoters, coupling agents, and others. The terminally unsaturated oligomers or macromonomers prepared according to the present invention can be employed, not only as non-metallic chain transfer agents, but as useful components or intermediates in the production of graft copolymers, non-aqueous dispersed polymers, microgels, star polymers, branched polymers, and ladder polymers.

End products taking advantage of available characteristics can include, for example, automotive and architectural coatings or finishes, including high solids, aqueous, or solvent based finishes. Poly(chloroprene) in particular finds use in items such as adhesives and "O"-rings, and in electrical insulation, conveyer belts and protective clothing when vulcanized.

The product of the reaction is a terminally-functionalized polymer or oligomer of the structure

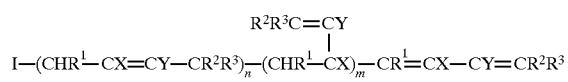

wherein
  I is an initiating group derived from an initiator for said polymerization process, or a hydrogen atom derived from said cobalt chain transfer catalyst;
  n is greater than 2;
  m is zero or greater; and
  wherein $R^1$, $R^2$, and $R^3$ are selected from the group consisting of alkyl, substituted alkyl, aryl, substituted aryl, halide, nitrile, ester, ether, CN and hydrogen;
  said alkyl and substituted alkyl groups having one or more carbon atoms;
  said aryl groups having six or more carbon atoms.

The preferred product of the reaction with chioroprene is a termnally-functionalized polymer or oligomer of the structure

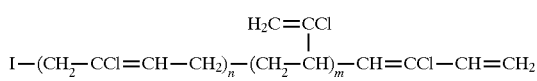

where n is greater than 2; and m is zero or greater.

The preferred product of the reaction with 2,3-dichloro-1,3-butadiene is a terminally-functionalized polymer or oligomer of the structure

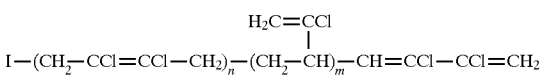

where n is greater than 2; and m is zero or greater.

The preferred product of the reaction of the chloroprene product with maleic anhydride is a terminally-functionalized polymer or oligomer of the structure

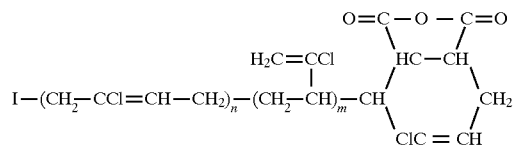

where n is greater than 2; and m is zero or greater.

The presence of terminal conjugated double bonds in the products made by this process is shown in two ways. [1]HMR clearly shows resonances at 6.2–6.6 ppm region in all polychloroprenes obtained with the cobalt catalyst. Experimenting with model compounds and two-dimensional NMR spectra prove that only protons of the following structure, =C(Cl)—CH=, can have such signals. Comparison of Mn's obtained by GPC correlate well with that obtained from NMR data considering 6.2–6.6 ppm signals coming from a single proton of the end group.

Also, it is known to those skilled in the art that conjugated dienes react with maleic anhydride in a very specific way different from that of non-conjugated di- and polyenes. This reaction is the Diels-Alder reaction (J. March. Advanced Organic Chemistry, Wiley: N.Y., 1992, p. 839). The catalytic chain transfer of this invention generates a pair of conjugated double bonds at the end or each polymeric or oligomeric chain. The presence of this active end group enables further functionalization of the resulting oligomer by functional dieneophiles such as anhydrides (for instance, maleic anhydride), nitriles (for instance, fumaronitrile or tetracyanoethylene), and amides (for instance, ethyl maleamide) through Diels-Alder reactions. The Diels-Alder reaction was successfully conducted with the terminally functionalized polychloroprenes of this invention with maleic anhydride as a dienophile (Example 8). Hence, this reaction proves that we have =C(Cl)—CH= end groups and that this group is as reactive as conjugated diene in its monomeric analogues.

The presence of the terminal conjugated double bond allows further modification of the chloroprene oligomers by grafting these oligomers onto other polymers, radical copolymerization with other monomers, synthesis of pigment dispersants and compatibilizers, production of reactive thermoset material, and the like.

$^1$H-NMR spectra were taken on a QE300 NMR spectrometer (General Electric Co., Freemont, Calif. 94539) at 300 MHz frequency.

$K^+$ IDS mass spectroscopy is an ionization method that produces pseudomolecular ions in the form of $[M]K^+$ with little or no fragmentation. Intact organic molecules are desorbed by rapid heating. In the gas phase the organic molecules are ionized by potassium attachment. Potassium ions are generated from an aluminosilicate matrix that contains $K_2O$. All of these experiments were performed on a Finnegan Model 4615 GC/MS quadrupole mass spectrometer (Finnegan MAT (USA), San Jose, Calif.). An electron impact source configuration operating at 200° C. and a source pressure of $<1 \times 10^{-6}$ torr was used.

MALDI MS (matrix-assisted laser desorption/ionization mass spectroscopy) was performed on a Vision® 2000 instrument (Thermo Bioanalysis Ltd., Paradise, Hemel Hempstead Herts., HP2 4TG, UK), generally following the technique as described by G. Montaudo, et al., in Macromolecules, 28 (1995), pp. 7983–89.0

MW and DP measurements were based on gel permeation chromatography (GPC) using styrene as a standard, and performed on a WISP 712 Chromatograph with 100 A, 500 A, 1000 A and 5000 A phenogel columns (Waters Corp., Marlborough, Mass. 01752-9162).

Definitions

Unless otherwise specified, all chemicals and reagents were used as received from Aldrich Chemical Co., Milwaukee, Wis.

The following abbreviations have been used and are defined as:

VAZO®,-52=2,2'-azobis(2,4-dimethylvaleronitrile) (DuPont Co., Wilmington, Del.)
VAZO®,-88=1,1'-azobis(cyclohexane-1-carbonitrile (DuPont Co., Wilmington, Del.)
AIBN=2,2'-azobisisobutyronitrile Neoprene®, =polychloroprene synthetic rubber (DuPont Co., Wilmington, Del.)
DP=degree of polymerization
$M_n$ is number average molecular weight
$M_w$ is weight average molecular weight
THF is tetrahydrofuran

EXAMPLES

General Procedure:

The polymerization of chloroprene (2-chloro-1,3-butadiene) was conducted in solution as well as in the bulk monomer at temperatures of between 50° C. and 90° C. The temperature of the process was determined by the azo-initiator used. Any chain transfer catalyst can be used in the process; the examples herein were done using primarily COBF which is one of the most active chain transfer catalysts. Other catalysts were used as well but with relatively lower efficacy. The polymer formed was isolated from the reaction mixture by evaporation, but could also be isolated by precipitation or any other method known to those skilled in the art. As shown below, the reaction can be done with "neat" monomer or with a solvent (1,2-dichloroethane) to achieve the desired end-product.

EXAMPLE 1

A reaction mixture containing 0.3 g COBF, 0.8 g VAZO®-52, 30 mi 2-chloro-1,3-butadiene and 60 ml 1,2-dichloroethane was degassed by three freeze-pump-thaw cycles and put into an oil-bath at 60° C. After 20 hours it was evaporated in vacuum to remove solvent and unreacted monomer to give 24 g of a waxy polymer. GPC analysis showed that the polymeric product had a number average degree of polymerization (Mn) of 1741 and a polydispersity index of 3.15.

EXAMPLE 2

A reaction mixture containing 20 mg bis-(diphenylglyoximato)(triphenyl phosphino)(chlorido)Co (III), 56 mg VAZO®,-52 and 8 ml 2-chloro-1,3-butadiene was degassed by three freeze-pump-thaw cycles and put into an oil-bath at 60° C. After 4 hours the reaction mixture was evaporated in a vacuum to give 6.1 g of a rubbery polymer. GPC analysis shows that the polymeric product had Mn=59200 and polydispersity index of 2.4.

EXAMPLE 3

A reaction mixture containing 200 mg COBF, 0.35 g VAZO®, -88, 20 ml 2-chloro-1,3-butadiene and 40 ml 1,2-dichloroethane was degassed by three freeze-pump-thaw cycles and put into an oil bath at 90° C. After 4 hours the reaction mixture was evaporated in a vacuum to give 12 g of viscous polymer. GPC analysis shows that the polymeric product had a Mn=471 and polydispersity index of 1.77.

EXAMPLE 4

A reaction mixture containing 6 mg of COBF, 20 mg AIBN, 3 ml 2-chloro-1,3-butadiene and 0.09 ml methacrylic acid was degassed by three freeze-pump-thaw cycles and put into an oil bath at 70° C. After 2 hours the reaction mixture was evaporated in a vacuum to give 0.6 g of a waxy polymer. GPC analysis showed that the polymeric product had an Mn=12100 and polydispersity index of 1.85.

EXAMPLE 5

A reaction mixture containing 2 mg COBF, 4 mg VAZO®-88, 1.5 mL 2-chloro-1,3-butadiene, 0.5 ml 1, 1-vinyledene chloride and 2 ml 1,2-dichloroethane was degassed by three freeze-pump-thaw cycles and put into an oil bath at 90° C. After 3 hours the reaction mixture was evaporated in high vacuum to give 0.4 g of a waxy polymer. $K^+$IDS analysis showed that more than 70% of all polymer chain contained the vinylidene units, $M_n$=720. Proton NMR showed characteristic to doublet of doublets resonance at 6.25 ppm.

EXAMPLE 6

A reaction mixture containing 2 mg COBF, 4 mg VAZO®-88, 1.8 mL 2-chloro-1,3-butadiene, 0.2 ml methacrylic acid and 2 ml 1,2-dichloroethane was degassed by three freeze-pump-thaw cycles and put into an oil bath at 90° C. After 3 hours the reaction mixture was evaporated in high vacuum to give 0.5 g of a waxy polymer. K⁺IDS analysis showed that more than 85% of all polymer chain contained the acrylic acid units, $M_n$ was about 500 (bimodal molecular weight distribution). Proton NMR showed several doublet of doublets resonance at 6.1–6.3 ppm.

EXAMPLE 7

A reaction mixture containing 12 mg COBF, 25 mg AIBN, 2 mL of 50% xylene solution of 2,3-dichloro-1,3-butadiene and 2 ml 1,2-dichloroethane was degassed by three freeze-pump-thaw cycles and put into an oil bath at 70° C. After 6 hours the reaction mixture was evaporated in high vacuum to give 0.6 g of white polymer. The polymer is partly soluble in methylene chloride. GPC analysis of the soluble part gave $M_n$=5240. Carbon and proton NMR indicate presence of the $R_n$—CCl=CCl=CH$_2$ fragments in the obtained polymer.

EXAMPLE 8

Oligochloroprene obtained in the Example 3 (1.2 g) was mixed with solution of 0.25 g of freshly sublimed maleic anhydride in 3 ml tetrahydrofuran. Obtained solution was kept 12 hours at 70° C. under nitrogen. After vacuum evaporation at room temperature the residual polymer was analyzed by MALDI mass spectrometry. Comparison of the MALDI spectra of the oligochloroprene before the heating with maleic anhydride and after the heating indicates that in the second case only one maleic anhydride unit per polymer chain was incorporated. NMR spectra showed disappearance of some vinylic protons (6.1–6.5 ppm) with simultaneous formation of new resonances characteristic to the Diels-Alder product as model experiments with monomeric chloroprene and maleic anhydride indicated.

What is claimed is:

1. A process for polymerizing substituted butadienes to substituted polybutadienes having controlled molecular weight and end-group functionality; wherein the process consists of:

contacting a substituted butadiene, in the optional presence of a comonomer, with a chain transfer catalyst comprising a cobalt (II) or cobalt (III) compound and a free radical initiator, said substituted butadienes having a structure

CHR¹=CX—CY=CR²R³ where X and Y are each independently selected from the group consisting of H, alkyl, substituted alkyl, COO(Metal), —COOR, CN, OR, —COR, —CONR$_2$, —OCOR, halogen, aryl, and substituted aryl;

where R is selected from the group consisting of alkyl, substituted alkyl, aryl, substituted aryl, and hydrogen;

said alkyl and substituted alkyl groups having one or more carbon atoms;

said aryl groups having six or more carbon atoms; and provided that both X and Y cannot both be H;

wherein the Metal is selected from the group consisting of lithium, sodium, potassium, magnesium, cadmium and zinc;

wherein $R^1$, $R^2$ and $R^3$ are each selected from the group consisting of alkyl, substituted alkyl, aryl, substituted aryl, halide, nitrile, ester, ether, CN and hydrogen;

said alkyl and substituted alkyl groups having one or more carbon atoms;

said aryl groups having six or more carbon atoms; and wherein any two of $R^1$ or $R^2$ and $R^3$ are optionally arranged in a cyclic structure;

said reaction carried out at a temperature from about room temperature to about 240° C., in the optional presence of a solvent.

2. The process of claim 1 wherein the temperature is about 50° C. to 150° C.

3. The process of claim 1 wherein the substituted butadiene is selected from the group consisting of chloroprene, isoprene, 2-phenyl-1,3-butadiene, cyanoprene, 2-carbomethoxy- 1,3-butadiene, and 2,3-dichloro- 1,3-butadiene.

4. The process of claim 2 wherein the substituted dienes are chloroprene or 2,3-dichloro- 1,3-butadiene.

5. The process of claim 4 wherein the metallic chain transfer catalyst is selected from the group consisting of cobalt (II) and (III) chelates or a mixture thereof.

6. The process of claim 5 wherein a comonomer is used and the comonomer is selected from the group consisting of acrylonitrile, methacrylonitrile, vinyl methyl ketone, 4-chlorostyrene, 4-chloromethylstyrene, 2,3-dimethylstyrene, 3,4-dichlorostyrene, 4-bromostyrene, 4-hydroxystyrene, 4-methoxystyrene, 4-oxymethylstyrene, 4-bromomethylstyrene, 4-styrenesulfonic acid, sodium salt of 4-styrenesulfonic acid, 4-styrenesulfonyl chloride, methyl acrylate, ethyl acrylate, propyl acrylate, 2-hydroxyethyl acrylate, 3-hydroxypropyl acrylate, 2-hydroxypropyl acrylate, butyl acrylate, amyl acrylate, hexyl acrylate, 2-ethylhexyl acrylate, nonyl acrylate, dodecyl acrylate, glycidyl acrylate, acrylamide, N,N'-dimethylacrylamide, bisacrylamide, 2-acrylamido-2-methyl-1-propanesulfonic acid, acrylic acid, sodium salt of acrylic acid, zinc salt of acrylic acid, acryloyl chloride, [2-(acryloyloxy)ethyl] trimethyl ammonium chloride, 2-ethyloxyethyl acrylate, 2-(N,N'-dimethylamino)-ethyl acrylate, methacryloyl chloride, methacrylic anhydride, acrylic anhydride, [2-(methacryloyloxy)ethyl]trimethyl ammonium chloride, 2-(methacryloyloxy)ethyl methacrylate, 2-(methacryloyloxy)ethylacetoacetate, [2-(methacryloyloxy)propyl]-trimethyl ammonium chloride, vinylchloride, 4-vinylbenzoic acid, vinyl acrylate, vinyl methacrylate, vinyl chloroformate, vinyl pyridine, benzyl acrylate, methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha methyl styrene, trimethoxysilylpropyl methacrylate, triethoxysilylpropyl methacrylate, tributoxysilylpropyl methacrylate, dimethoxymethylsilylpropyl methacrylate, diethoxymethyl-silylpropylmethacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, isopropenyl butyrate, isopropenyl acetate, isopropenyl benzoate, isopropenyl chloride, isopropenyl fluoride, isopropenyl bromide, itaconic acid, itaconic anhydride, dimethyl itaconate, methyl itaconate, N-tert-butyl methacrylamide, N-n-butyl methacrylamide, N-methyl-ol methacrylamide, N-ethyl-ol methacrylamide, isopropenylbenzoic acid (all isomers), diethylamino alpha-methylstyrene (all isomers), para-methyl-alpha-methylstyrene (all isomers), diisopropenylbenzene (all isomers), isopropenylbenzene sulfonic acid (all isomers), methyl 2-hydroxymethylacrylate, ethyl 2-hydroxymethylacrylate, propyl 2-hydroxymethylacrylate (all isomers), butyl 2-hydroxymethylacrylate (all isomers), 2-ethylhexyl 2-hydroxymethylacrylate, isobornyl 2-hydroxymethylacrylate, methyl 2-chloromethylacrylate, ethyl 2-chloromethylacrylate, propyl 2-chloromethylacrylate (all isomers), butyl 2-chloromethylacrylate (all isomers), 2-ethylhexyl 2-chloromethylacrylate, isobornyl 2-chloromethylacrylate and vinylpyrrolidone.

7. A terminally functionalized oligomer or polymer having the structure:

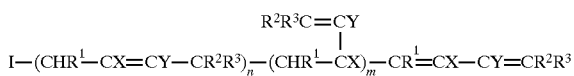

wherein

I is an initiating group derived from an initiator for said polymerization process, or a hydrogen atom derived from a cobalt (II) or cobalt (III) chain transfer catalyst;

where X and Y are each independently selected from the group consisting of H, alkyl, substituted alkyl, COO(Metal), COOR, CN, OR, COR, COOR, CONR$_2$, OCOR, halogen, aryl, and substituted aryl;

where R is selected from the group consisting of alkyl, substituted alkyl, aryl, substituted aryl, and hydrogen;

said alkyl and substituted alkyl groups having one or more carbon atoms;

said aryl groups having six or more carbon atoms; and provided that both X and Y cannot both be H;

wherein the Metal is selected from the group consisting of lithium, sodium, potassium, magnesium, cadmium and zinc;

n is greater than 2;

m is zero or greater; and wherein $R^1$, $R^2$, and $R^3$ are selected from the group consisting of alkyl, substituted alkyl, aryl, substituted aryl, halide, nitrile, ester, ether, CN and hydrogen;

said alkyl and substituted alkyl groups having one or more carbon atoms;

said aryl groups having six or more carbon atoms.

8. The process of claim 1 wherein the initiator is an azo compound.

9. The process of claim 8 wherein the initiator is selected from the group consisting of azocumene; 2,2'-azobis(2-methyl)-butanenitrile; 2,2'-azobis(isobutyronitrile)(AIBN); 4,4'-azobis(4-cyanovaleric acid); and 2-(t-butylazo)-2-cyanopropane.

10. The process of claim 1 conducted in the presence of a solvent selected from the group consisting of ketones, alcohols, amides, aromatic hydrocarbons, ethers, dialkyl ethers, alkyl esters, mixed ester ethers and mixtures of two or more of said solvents.

11. The oligomer or polymer as recited in claim 7, wherein either X or Y is Cl.

12. The oligomer or polymer as recited in claim 7, wherein both X and Y are Cl.

13. The oligomer or polymer as recited in claim 7, wherein X or Y is CH$_3$.

* * * * *